US010845338B2

(12) United States Patent
Fuchs et al.

(10) Patent No.: US 10,845,338 B2
(45) Date of Patent: Nov. 24, 2020

(54) FLUID METER INCLUDING A FIRST WALL THICKNESS IN THE AREA OF A TRANSMITTER AND IN THE AREA OF A RECEIVER AND A SECOND WALL THICKNESS IN THE AREA THERE BETWEEN

(71) Applicants: Buerkert Werke GmbH & Co. KG, Ingelfingen (DE); Burkert S.A.S., Triembach-au-Val (FR)

(72) Inventors: Yannick Fuchs, Ingelfingen (DE); Yves Hoog, Ingelfingen (DE); Bertrand Koenig, Ingelfingen (DE); Stanislas Clatot, Ingelfingen (DE)

(73) Assignees: BUERKERT WERKE GMBH & CO. KG (DE); BURKERT S.A.S. (FR)

( * ) Notice: Subject to any disclaimer, the term of this patent is extended or adjusted under 35 U.S.C. 154(b) by 0 days.

(21) Appl. No.: 16/398,361

(22) Filed: Apr. 30, 2019

(65) Prior Publication Data
US 2019/0331642 A1 Oct. 31, 2019

(30) Foreign Application Priority Data

Apr. 30, 2018 (FR) ...................... 18/00392

(51) Int. Cl.
G01N 29/02 (2006.01)
(52) U.S. Cl.
CPC . *G01N 29/022* (2013.01); *G01N 2291/02809* (2013.01); *G01N 2291/02818* (2013.01); *G01N 2291/02836* (2013.01); *G01N 2291/02881* (2013.01); *G01N 2291/0423* (2013.01)
(58) Field of Classification Search
None
See application file for complete search history.

(56) References Cited

U.S. PATENT DOCUMENTS

| 3,906,791 | A | * | 9/1975 | Lynnworth | ............... G01F 1/66 73/861.29 |
| 4,735,097 | A | * | 4/1988 | Lynnworth | .......... G01N 29/343 73/861.28 |
| 4,838,127 | A | * | 6/1989 | Herremans | ........... B06B 1/0622 73/642 |
| 5,179,862 | A | * | 1/1993 | Lynnworth | ............. G01F 1/662 73/861.28 |

(Continued)

*Primary Examiner* — Harshad R Patel
(74) *Attorney, Agent, or Firm* — Dilworth IP, LLC

(57) ABSTRACT

A fluid meter has a measuring tube which has a fluid channel allowing a fluid (F) to flow through and which has a measuring section in which at least one area of a measuring tube wall is formed as a waveguide for surface acoustic waves, which forms an interface with the fluid (F), and at least one transmitter for exciting acoustic waves in the waveguide as well as at least one receiver for receiving acoustic waves from the waveguide, wherein acoustic waves excited by the transmitter can propagate through the fluid (F) as a bulk wave (V) and the bulk wave (V) has at least one reflection point (IP) on the measuring tube wall. The measuring tube wall has a first wall thickness (T1) in the area of the transmitter and in the area of the receiver and has a second wall thickness (T2) which differs from the first wall thickness (T1) in the area of all reflection points (IP) of the bulk wave (V).

20 Claims, 4 Drawing Sheets

(56) References Cited

U.S. PATENT DOCUMENTS

| | | | | |
|---|---|---|---|---|
| 5,351,560 A * | 10/1994 | Russwurm | ............ | G01F 1/662 |
| | | | | 73/861.27 |
| 6,418,796 B1 * | 7/2002 | Baumoel | ............... | G01F 1/662 |
| | | | | 73/861.27 |
| 6,575,043 B1 * | 6/2003 | Huang | .................. | G01F 1/002 |
| | | | | 73/861.18 |
| 7,363,174 B2 * | 4/2008 | Kishiro | .................. | G01F 1/663 |
| | | | | 702/54 |
| 2006/0123922 A1 * | 6/2006 | Froehlich | ........... | G01F 25/0007 |
| | | | | 73/861.29 |
| 2007/0034016 A1 * | 2/2007 | Maginnis | ............... | G01F 1/662 |
| | | | | 73/861.28 |
| 2008/0163700 A1 * | 7/2008 | Huang | .................. | G01F 1/663 |
| | | | | 73/861.25 |
| 2011/0239769 A1 | 10/2011 | Schmitt et al. | | |
| 2012/0285260 A1 * | 11/2012 | Mueller | ................. | G01F 1/662 |
| | | | | 73/861.27 |
| 2014/0260664 A1 | 9/2014 | Gledhill, III et al. | | |
| 2014/0360270 A1 * | 12/2014 | Koenig | ............... | G01N 29/221 |
| | | | | 73/597 |
| 2015/0013472 A1 * | 1/2015 | Gill | ........................ | G01F 1/662 |
| | | | | 73/861.31 |
| 2019/0242851 A1 * | 8/2019 | Sinha | ................. | G01N 29/223 |
| 2019/0368907 A1 * | 12/2019 | Fuchs | ................. | G01N 29/221 |
| 2020/0096372 A1 * | 3/2020 | Fuchs | ................... | G01F 15/18 |

* cited by examiner

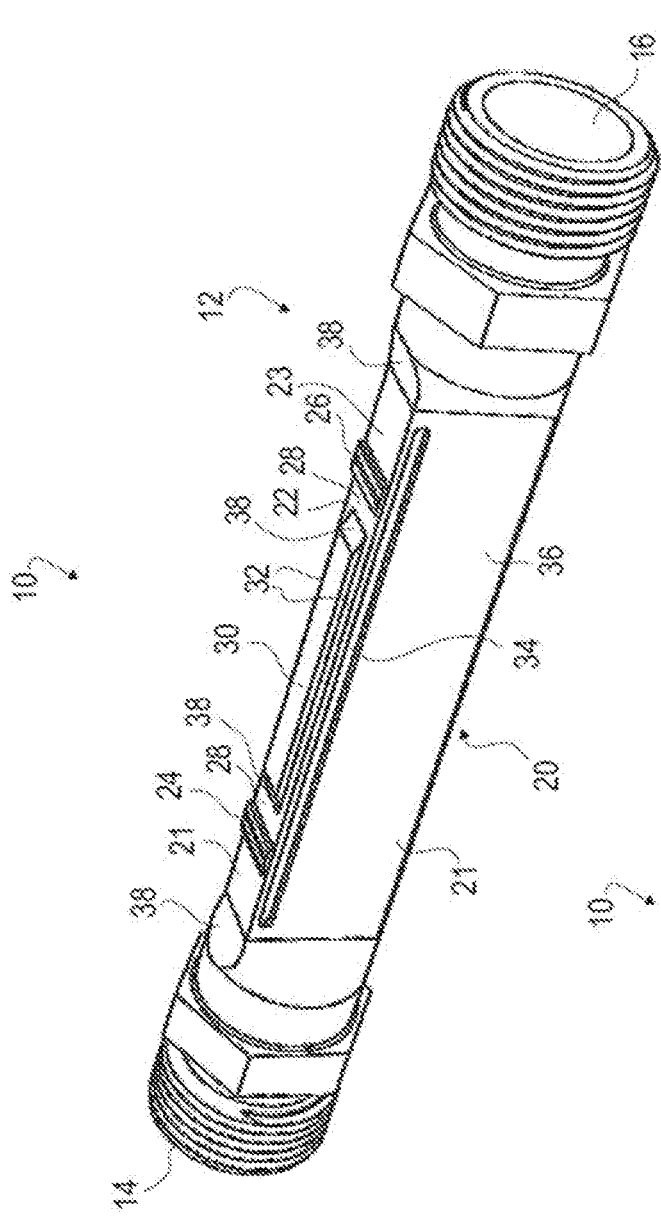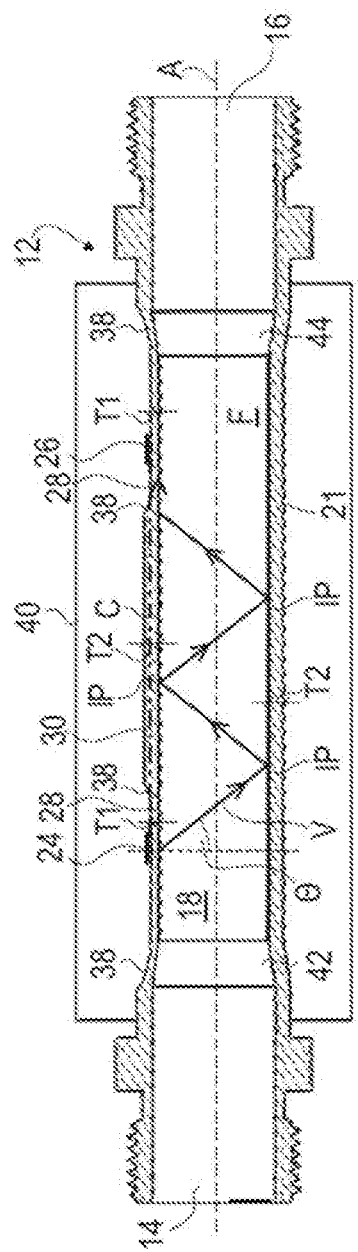

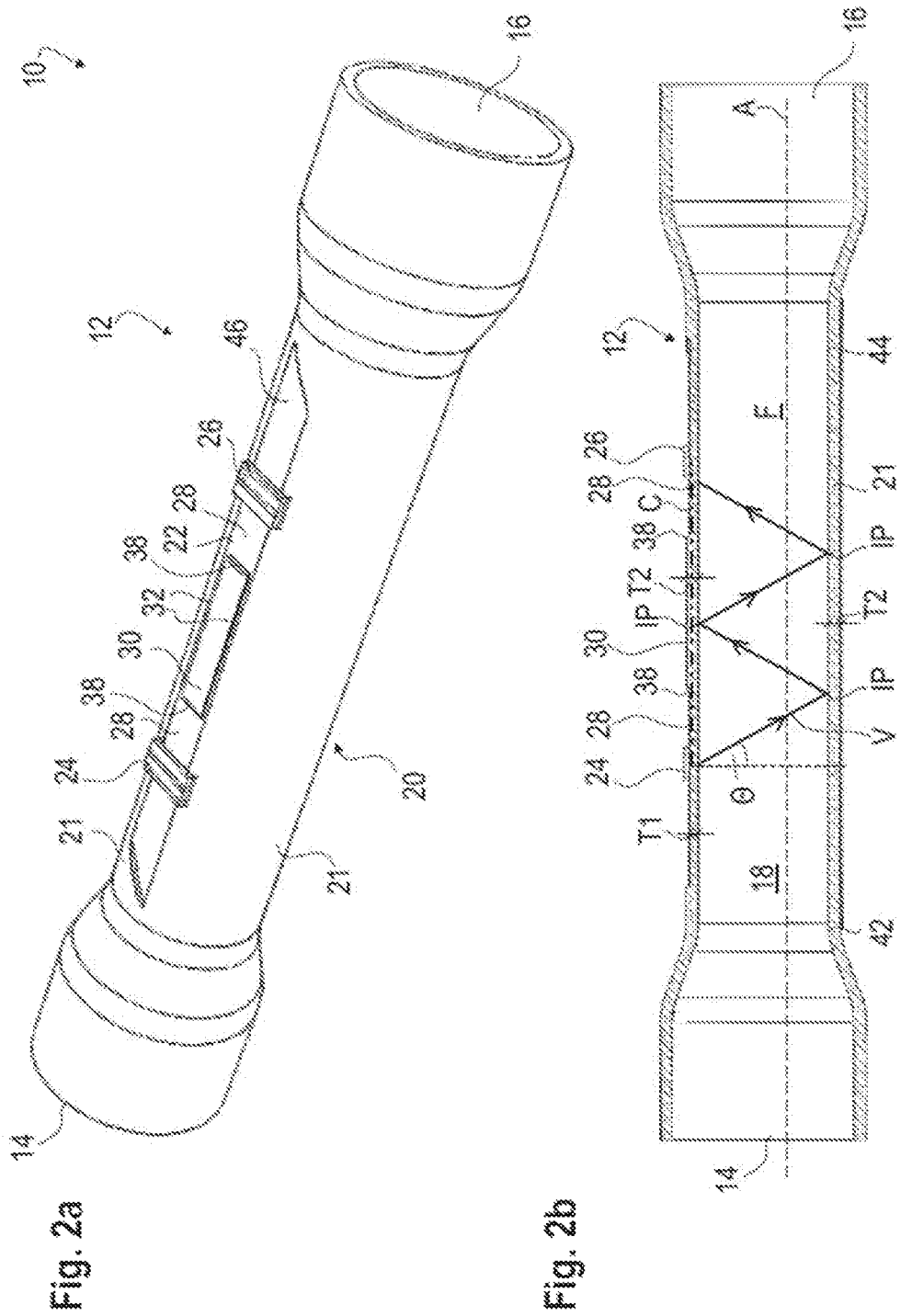

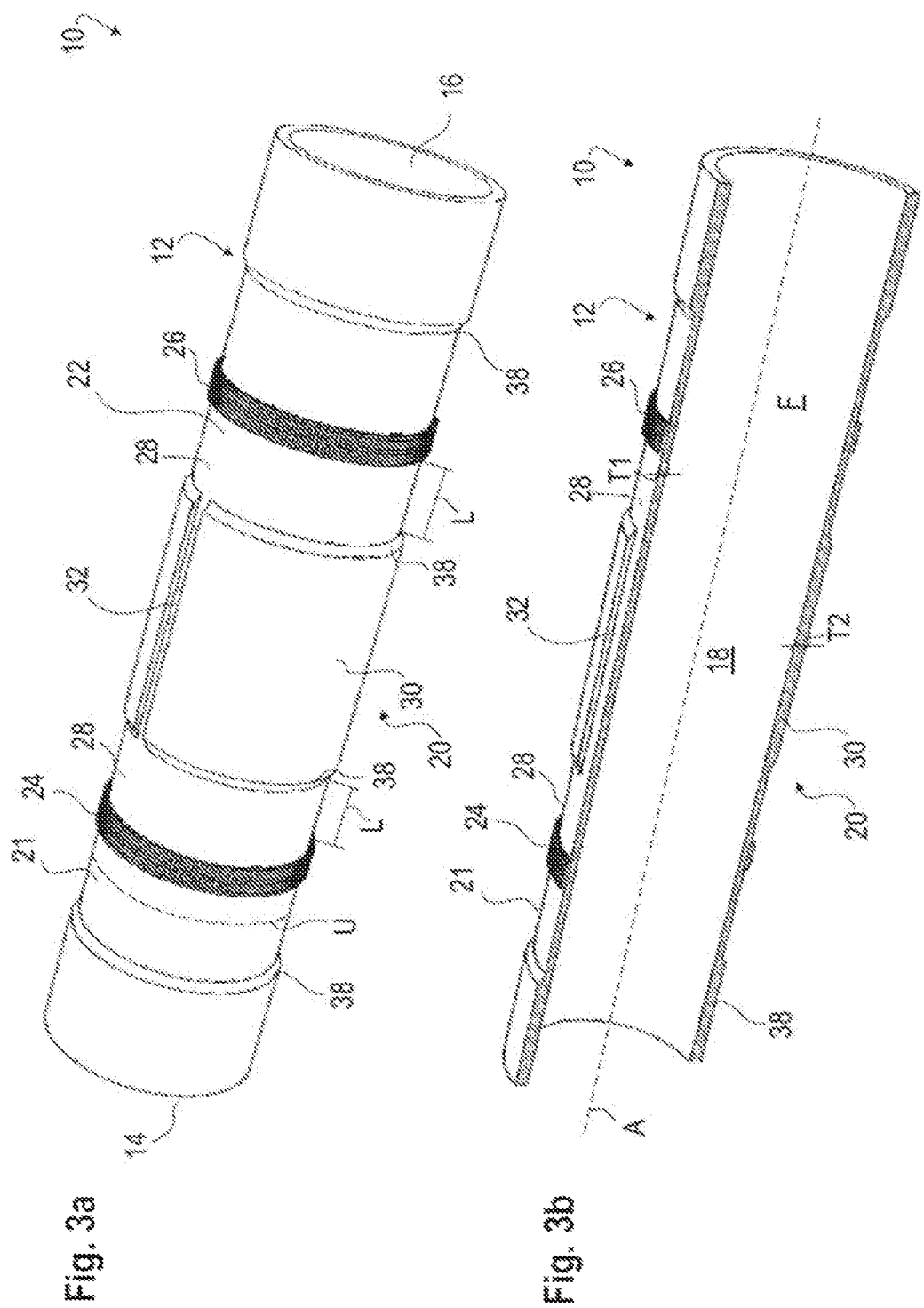

ate one area of a measuring tube wall is formed as a waveguide
FLUID METER INCLUDING A FIRST WALL THICKNESS IN THE AREA OF A TRANSMITTER AND IN THE AREA OF A RECEIVER AND A SECOND WALL THICKNESS IN THE AREA THERE BETWEEN The invention relates to a fluid meter for determining at least one characteristic property of a fluid, with a measuring tube which has a fluid channel allowing the fluid to flow through and which has a measuring section in which at least one area of a measuring tube wall is formed as a waveguide for surface acoustic waves, which forms an interface with the fluid, and at least one transmitter for exciting acoustic waves in the waveguide as well as at least one receiver for receiving acoustic waves from the waveguide, which are arranged in direct contact with an outer surface of the waveguide, wherein acoustic waves excited by the transmitter can propagate through the fluid at least in sections as a bulk wave and the bulk wave has at least one reflection point on the measuring tube wall.

BACKGROUND OF THE INVENTION

The properties of the fluid are e.g. its concentration, viscosity, sound velocity, flow rate, flow, temperature and/or homogeneity.

The invention relates in particular to a fluid meter for determining fluid which is flowing through it.

Such a fluid meter is known from DE 10 2014 106 706 A1 and serves to measure particular properties of the fluid flowing in the fluid channel with the aid of acoustic waves. For this, surface acoustic waves (SAW) are excited in the waveguide, the type and frequency of which are chosen such that a partial coupling-out into the fluid in direct contact with the waveguide is effected. Some of the surface acoustic waves in the waveguide are thus coupled into the fluid and pass through it as longitudinal bulk acoustic waves.

On their way through the fluid, the acoustic waves are reflected at least once on an opposite wall of the fluid channel, with the result that they strike the waveguide again, where some of these bulk waves are coupled into the waveguide again and continue in it as surface acoustic waves. This results, at the receiver, which is arranged spaced apart from the transmitter on the waveguide, in a characteristic signal the temporal intensity gradient of which (including the time lag relative to the signal emitted by the transmitter) allows conclusions as to the characteristic properties of the fluid such as e.g. sound velocity, temperature, homogeneity, flow rate, flow, concentration or viscosity.

In order to achieve a high measurement accuracy in the acoustic wave measurement method, a long distance traveled by the bulk wave through the fluid is necessary, in particular in the case of low fluid flows. For this, in principle, a long measuring section between transmitter and receiver would be advantageous, whereby for geometric reasons several reflections of the bulk wave result on the inner side of the measuring tube wall.

For this very reason, however, the length of the measuring section in known meters is limited, as with every reflection of the bulk wave on the wall some of its energy couples into the measuring tube wall and is thereby reflected less. The bulk wave consequently becomes much weaker with every interaction, which leads to the decrease in the signal strength at the receiver.

SUMMARY OF THE INVENTION

The object of the invention is therefore to provide a fluid meter which is characterized by an enlarged measuring area with good signal strength, in particular for the measurement of low fluid flows.

According to the invention, this is achieved in the case of a fluid meter of the type named at the beginning in that the measuring tube wall has a first wall thickness in the area of the transmitter and in the area of the receiver (i.e. on the wall section to which transmitter and receiver are secured) and has a second wall thickness which differs from the first wall thickness in the area of all reflection points of the bulk wave.

In the case of known measuring tubes according to the state of the art, the entire wall thickness between transmitter and receiver is constant and designed such that the surface waves couple well into the fluid. However, at each reflection point of the bulk wave on the measuring tube wall some of the energy is coupled into the tube wall and is thereby reflected less. The bulk wave becomes weaker with every interaction and the signal arriving at the receiver is correspondingly weakened.

The invention starts from here. It has been established that the energy transfer to the measuring tube wall is decisively influenced by the choice of the wall thickness. In order for less energy to be transferred to the measuring tube wall at a reflection point of the bulk wave, the second wall thickness present at the reflection point is chosen differing from the first wall thickness which is optimal for the coupling-in and coupling-out in the area of the transmitter and receiver. In this way, the desired reflection at the reflection point or points can be improved, because it is made more difficult there for the acoustic waves to couple into the measuring tube wall, at best this is even prevented entirely. With the design according to the invention, a much longer distance traveled by the bulk wave through the fluid and thus an enlarged measuring area can thus be realized with good signal strength, which is advantageous in particular for the measurement of low fluid flows.

The invention is also achieved by a fluid meter for determining at least one characteristic property of a fluid, with a measuring tube which has a fluid channel allowing the fluid to flow through and which has a measuring section in which at least one area of a measuring tube wall is formed as a waveguide for surface acoustic waves, which forms an interface with the fluid, and at least one transmitter for exciting acoustic waves in the waveguide as well as at least one receiver for receiving acoustic waves from the waveguide, which are arranged in direct contact with an outer surface of the waveguide, wherein acoustic waves excited by the transmitter can propagate through the fluid at least in sections as a bulk wave and the bulk wave can reflect at least once on the measuring tube wall in a reflection area between transmitter and receiver. The measuring tube wall has a first wall thickness in the area of the transmitter and in the area of the receiver and a second wall thickness which differs from the first wall thickness in the reflection area on an imaginary line, running in the tube wall, parallel to the longitudinal axis of the measuring tube, which runs through the coupling-in area of the transmitter.

The at least one reflection point, in the area of which the measuring tube wall has the second wall thickness, lies between transmitter and receiver, in particular viewed along the longitudinal axis of the measuring tube.

In particular, the transmitter and the receiver lie on a straight connecting line which runs parallel to the longitudinal axis of the fluid channel. In this variant of the invention, then, the area with the second wall thickness also lies on this straight connecting line, i.e. on the straight connecting line there is an area with the first wall thickness in the area of the transmitter and of the receiver in each case, and between these areas there is the area with the second wall thickness.

The longitudinal axis of the fluid channel runs preferably linearly between transmitter and receiver.

Known attenuation elements can be present on the transmitter and/or the measuring tube wall, which ensure a directed transfer of the waves by the transmitter or a directed wavefront, with the result that the reflection points and reflection areas are very precisely defined.

The first wall thickness of the measuring tube wall is preferably smaller than or identical to the wavelength of the surface acoustic wave, in particular it is 40 to 60%, preferably 50%, of the wavelength of the surface acoustic wave. With this optimal wall thickness, the surface waves are particularly well coupled into the wall from the transmitter, from where they propagate further into the fluid.

In a preferred design, the second wall thickness is 20% to 95%, in particular 50%, larger or smaller than the first wall thickness. It is thus possible to inhibit the coupling of the surface waves into the wall by having a thicker or a thinner wall thickness and thus to improve the reflection at the reflection points. The first and second wall thicknesses are in particular constant in each case.

In order to achieve a high mechanical strength of the measuring tube, the second wall thickness is advantageously larger than the first wall thickness.

In a preferred embodiment, between the transmitter and the receiver an intermediate area is provided which is elongate in the axial direction of the measuring tube and which connects the areas of the transmitter and receiver with the first wall thickness in the axial direction, wherein the intermediate area, in each radial section viewed individually, has a constant wall thickness in the axial direction. The elongate intermediate area has in particular the second wall thickness.

The bulk wave advantageously has several reflection points on the measuring tube wall, wherein the measuring tube wall has the second wall thickness in the area of each reflection point. A long distance traveled by the bulk wave through the fluid thereby results with, at the same time, good signal strength. In particular, the measuring tube wall thus also has the second wall thickness on the side opposite an (imaginary) connecting line between transmitter and receiver.

Particularly good measurement results can be achieved if the bulk wave has at least 1 to 6 reflection points on the measuring tube wall, in particular 3 reflection points, in areas of the measuring tube wall which have the second wall thickness.

In the area of the transmitter and in the area of the receiver in each case an area of wall with the first wall thickness is preferably provided which, starting from the side of the transmitter facing the receiver as well as starting from the side of the receiver facing the transmitter, in each case extends axially over a length of from 1 to 20 wavelengths, in particular 5 to 10 wavelengths. This makes it possible in the area of the transmitter for the surface wave to couple well into the measuring tube wall first and then into the fluid. Conversely, an area upstream of the receiver with the first wall thickness makes it easier to convert the bulk wave into surface waves in the measuring tube wall, which are then converted into electrical signals by the receiver.

In order to avoid undesired reflections of the surface waves at, for example, edges or cross-sectional jumps, the areas with different wall thicknesses preferably merge into each other constantly and step-free at least in the propagation direction of the surface waves.

In a preferred design, in an intermediate area between the area of the transmitter and that of the receiver a continuous groove in the measuring tube wall, in which the measuring tube wall preferably has the first wall thickness, extends in the area with the second wall thickness, with the result that transmitter and receiver are acoustically coupled to each other directly via the groove, in particular wherein the wall thickness in the intermediate area outside the groove is constant. Via this groove the surface waves can propagate particularly well inside the tube wall, the more so as their propagation is made much more difficult in the areas with the second wall thickness.

In particular, surface waves outside the fluid propagate from the transmitter to the receiver directly via the continuous groove.

The transmitter and the receiver can be formed as piezoelectric transducers, in particular as interdigital transducers, which preferably act alternately as transmitter and as receiver. If transmitter and receiver alternate, the fluid flow can be inferred e.g. from the difference in transit times of the bulk waves.

In order to make further measurement methods possible or to improve the accuracy of the measurement results, it is possible to provide several transmitters and/or receivers on the measuring tube, wherein one transmitter and one receiver are arranged on a common wall area with the first wall thickness.

The transmitter and the receiver preferably extend over at least 90% of the width of the fluid channel. This makes it possible to acoustically scan the fluid in almost the complete channel width, which makes the fluid meter much less sensitive to a flow distributed unevenly over the flow cross section in the fluid channel. In the case of a round cross section of the fluid channel, the "width" naturally corresponds to the diameter or half the circumference.

According to a preferred embodiment, the measuring tube has a substantially angular cross section in the measuring section. By this is meant both the internal cross section, thus the cross section of the fluid channel, and the external cross section of the measuring tube, wherein the actual "corners" can be rounded. In particular, the measuring tube has a substantially rectangular or substantially square cross section in the measuring section, again with rounded corners if desired.

The transmitter and the receiver are advantageously arranged on the shorter side of a substantially rectangular cross section of the measuring section. The path covered by the bulk wave through the fluid thereby lengthens, whereby the measuring area of the fluid meter expands.

In a further embodiment, the measuring tube has a round cross section in the measuring section and a flat area, on which the transmitter and the receiver are arranged, is formed in the outer surface of the measuring tube in the measuring section. The flat area can be produced e.g. by milling and at the same time makes it possible in a simple manner to introduce areas with reduced wall thickness (in particular the first wall thickness) into the measuring tube.

A further alternative embodiment provides that the measuring tube has a round cross section in the measuring section and the shape of the transmitter and that of the receiver are matched to the round outer surface of the measuring tube. Thus, a fluid meter which is simply constructed and particularly convenient to produce, for instance by turning, also results.

The transmitter and the receiver preferably extend at least over part of the circumference of the measuring tube, preferably over the entire circumference or almost the entire circumference.

Likewise, in this design, a wall section which has the second wall thickness and extends almost over the entire circumference of the measuring tube can be provided between the transmitter and the receiver. In particular, the measuring tube is designed with the second wall thickness in this section, wherein a continuous groove in the measuring tube wall, in which the measuring tube wall has the first wall thickness, is preferably also provided here, with the result that transmitter and receiver are acoustically coupled to each other directly via the groove.

BRIEF DESCRIPTION OF THE DRAWINGS

Further features and advantages are revealed by the following description of several preferred embodiments with reference to the attached drawings. There are shown in:

FIG. 1a a perspective view of a first embodiment of a measuring tube for a fluid meter according to the invention;

FIG. 1b a longitudinal section through a fluid meter with the measuring tube from FIG. 1a;

FIG. 1c a perspective sectional view of the measuring tube from FIG. 1a;

FIG. 1d a perspective partial sectional view of the measuring tube from FIG. 1a;

FIG. 2a a perspective view of a second embodiment of a measuring tube for a fluid meter according to the invention;

FIG. 2b a longitudinal section through the measuring tube from FIG. 2a;

FIG. 3a a perspective view of a third embodiment of a measuring tube for a fluid meter according to the invention; and FIG. 3b a perspective longitudinal section through the measuring tube from FIG. 3a.

DETAILED DESCRIPTION OF THE INVENTION

Figure 1C:
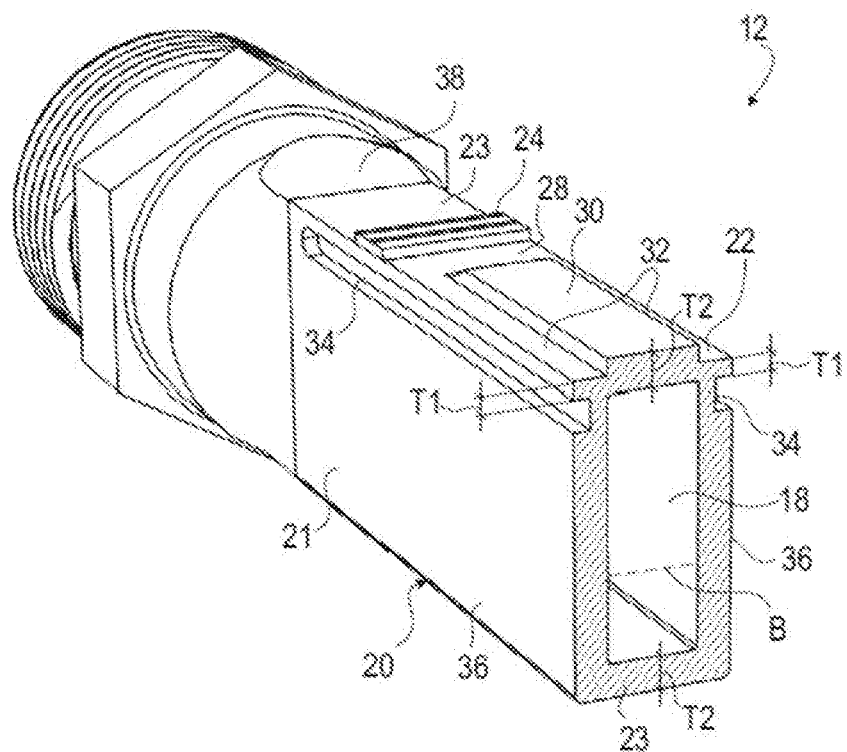
Figure 1D:
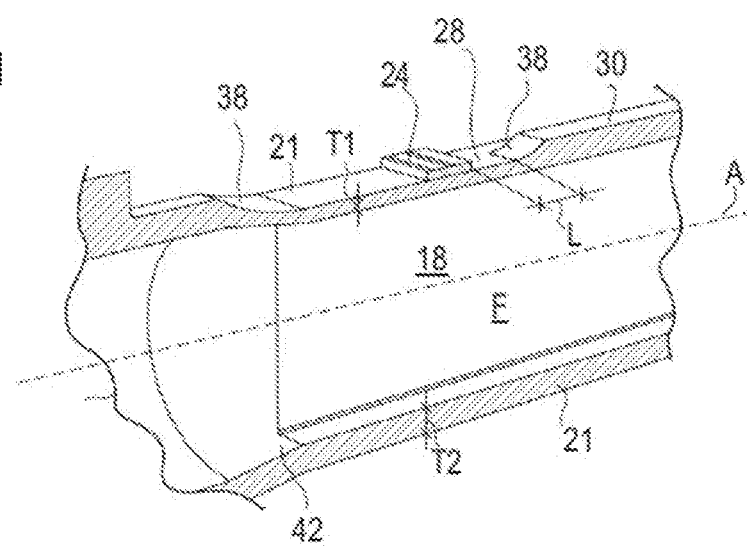

FIGS. 1a to 1d show a fluid meter 10 according to a first embodiment of the invention. It has a measuring tube 12 with a fluid inlet 14, a fluid outlet 16 and a fluid channel 18 running between them, through which a fluid F can flow. A middle section of the measuring tube 12 acts as measuring section 20, in which an area of a measuring tube wall 21 is formed as a waveguide 22 for surface acoustic waves, which forms an interface with the fluid F. In the embodiment of FIGS. 1a to 1d, the measuring tube 12 has a rectangular cross section in the measuring section 20, as can be seen in particular from FIG. 1c.

On the outside of the measuring tube 12, here on one of the two shorter sides 23 of the rectangular cross section, a transmitter 24 for exciting acoustic waves in the waveguide 22 as well as a receiver 26 for receiving acoustic waves from the waveguide 22 are arranged spaced apart from each other in direct contact with an outer surface of the waveguide 22.

In order to measure particular properties of the fluid F inside the fluid channel 18, the transmitter 24 excites surface acoustic waves in the area of the waveguide 22 directly underneath the transmitter 24. These surface waves run along the measuring tube wall acting as waveguide 22 inter alia in the direction of the receiver 26 and are detected there.

Because of the direct interface of the fluid F with the waveguide 22, some of the energy of the surface acoustic waves is coupled out on the inner surface of the measuring tube 12 at the interface with the fluid F and from there runs through the fluid at a specific propagation angle $\Theta$ (relative to a surface normal of the waveguide 22) as a bulk wave V (see FIG. 1b).

If the fluid F does not move in the measuring tube 12, the angle of incidence $\Theta$ of the bulk wave V into the fluid F results from the ratio of the sound velocity $c_f$ in the fluid F to the sound velocity $c_w$ of the surface wave in the measuring tube wall 21 (or in the waveguide 22), as $\Theta = \arcsin(c_f/c_w)$.

The angle $\Theta$ thus results from the "material pairing", wherein the sound velocity $c_w$ in the measuring tube wall 21 must be higher than the sound velocity $c_f$ in the fluid F in order for a value different from zero to result, below which the surface wave couples into the fluid F and covers a spatial distance along the waveguide 22 in this as bulk wave V. The surface waves include, among others, Lamb waves, Rayleigh waves or leaky Rayleigh waves, which are used here.

On the opposite side of the fluid channel 18, in a first reflection point IP which defines a reflection area around it, the bulk wave V strikes the measuring tube wall 21 again and is reflected. In this way the bulk wave V propagates through the fluid F. Whenever the bulk wave V strikes the measuring tube wall 21 in a further reflection point IP with a reflection area, there is the possibility that surface acoustic waves will be coupled into the measuring tube 12. These then run through the measuring tube wall acting as waveguide 22 to the receiver 26 and are likewise detected there. From the transit time lag between a wave pulse emitted by the transmitter 24 and the signal arriving at the receiver 26 as well as from the intensity and time response thereof, conclusions can be drawn as to the properties of the fluid F, such as its concentration, viscosity, sound velocity, flow rate, flow, temperature and homogeneity.

In order for the energy transmission into the fluid F to function well, it is necessary that the wall thickness of the measuring tube 12 lies in a defined size range. For this, in the area of the transmitter 24 and of the receiver 26 in each case the measuring tube wall 21 has a wall area 28 with a first wall thickness T1 which is smaller than or identical to the wavelength $\lambda$ of the surface acoustic wave, here is preferably 50% of the wavelength $\lambda$ of the surface acoustic wave. Due to the presence of the first wall thickness T1 in the areas 28, the generation of surface waves at the transmitter 24 and the reconversion of bulk waves V into surface waves at the receiver 26 are particularly effective. The wall area 28 extends not only directly below the transmitter 24 or the receiver 26, but in addition, starting from the side of the transmitter 24 facing the receiver 26 as well as starting from the side of the receiver 26 facing the transmitter 24, in each case axially over a length L, which here is 5 to 10 wavelengths $\lambda$ of the surface acoustic wave (see FIG. 1d). This makes it possible in the area of the transmitter 24 for the surface wave to couple well into the measuring tube wall 21 first and then into the fluid F. Conversely, an area upstream of the receiver 26 with the first wall thickness T1 makes it easier to convert the bulk wave V into surface waves in the measuring tube wall 21, which are then converted into electrical signals by the receiver 26.

On the other hand, the measuring tube wall 21 has a second wall thickness T2 which differs from the first wall thickness T1 in the area of all reflection points IP of the bulk wave V. In the example shown, the bulk wave V has three reflection points IP on the measuring tube wall 21, of which one (at the top in FIG. 1b) is arranged between transmitter 24 and receiver 26 on or in the immediate vicinity of an imaginary connecting line C, which runs in particular parallel to the longitudinal axis of the fluid channel. The other two reflection points IP lie on the opposite (lower) wall of the fluid channel 18.

The second wall thickness can be 20% to 95% larger or smaller than the first wall thickness T1, in the example shown it is approximately 50% larger than the first wall thickness T1. In the area with the larger (or also smaller) wall thickness T2 the surface waves cannot propagate as well inside the measuring tube wall 21. Likewise, it is more difficult to excite a thicker (or thinner) measuring tube wall 21 by the bulk wave V to form surface waves—the bulk waves V do not couple as well into the measuring tube wall 21 with the second wall thickness T2. This means, by implication, that a better reflection of the bulk wave V is effected at the reflection points IP on the inner side of the measuring tube wall 21, because it is made more difficult there for the acoustic waves to couple into the measuring tube wall 21, at best this is even prevented entirely. The signal strength at the receiver 26 can thus be improved.

The number and position of the reflection points IP is given by the dimensions of the fluid channel 18 and the angle $\ominus$. As the angle $\ominus$ is dependent on the flow rate in the fluid channel 18 and the bulk wave V has a broad wavefront, the areas with the second wall thickness T2 are generously dimensioned.

In the example shown, almost the entire measuring tube 12 thus has the second wall thickness T2 in the measuring section 20, with the exception of the wall areas 28 acting as coupling-in and coupling-out areas.

In particular, between the two wall areas 28 with the first wall thickness T1 an intermediate area 30 is provided which is elongate in the axial direction A of the measuring tube 12 and which connects the wall areas 28 of the transmitter 24 and receiver 26 with the first wall thickness T1 in the axial direction A, wherein the intermediate area 30, in each radial section viewed individually, has a constant wall thickness (usually the second wall thickness T2) in the axial direction A.

In addition, in the intermediate area 30 two continuous grooves 32, open on two sides, in the measuring tube wall 21 in which the measuring tube wall 21 has the first wall thickness T1 extend in the area with the second wall thickness T2. In this way, transmitter 24 and receiver 26 are acoustically coupled to each other directly via the grooves 32, which makes the propagation of the surface waves from the transmitter 24 to the receiver 26 outside the fluid F easier. In the intermediate area 30 outside the grooves 32 the wall thickness is constant and in particular corresponds to the second wall thickness T2.

In the example shown with fluid channel 18 rectangular in cross section, the grooves 32 are thus located (when viewed in the axial direction A) laterally outside a "raised" area with the second wall thickness T2 in the corners (or longitudinal edges) of the measuring tube 12 (see FIG. 1c). In this embodiment example, the grooves 32 are arranged such that no fluid channel 18 is located under them. In this design, the smaller first wall thickness T1 in the area of the grooves 32 is achieved in that elongate recesses 34 underneath the grooves 32 are introduced into the sides 36 of the measuring tube 12. Thus, between transmitter 24 and receiver 26 two continuous areas of the measuring tube wall 21 result, which have the first wall thickness T1 and do not have an interface with the fluid F, as they are arranged laterally outside the fluid channel 18, relative to a width B of the fluid channel 18.

Between the areas with different wall thicknesses T1 and T2, in the propagation direction of the surface waves, transition areas 38 are arranged, with the result that at least in the propagation direction of the surface waves (which here corresponds to the axial direction A) the areas with different wall thicknesses T1 and T2 merge into each other constantly and step-free. This reduces or prevents undesired reflections of the surface waves at, for example, edges or cross-sectional jumps.

The transmitter 24 and the receiver 26 are preferably formed as piezoelectric transducers, in particular as interdigital transducers, wherein the surface waves are generated in the measuring tube wall 21 by the application of an AC voltage. An attenuation material (not shown) can be attached both to the transmitter 24 and to the receiver 26, in order to exactly define the wave propagation. Both piezoelectric transducers are constructed identically and can be used as transmitter or as receiver. If transmitter 24 and receiver 26 alternate, the fluid flow can be inferred e.g. from the difference in transit times of the bulk waves V.

Moreover, it is possible to provide more than two piezoelectric transducers on the measuring tube 12, wherein two piezoelectric transducers are then arranged on a common wall area with the first wall thickness T1.

An electronic evaluation unit (not shown) is advantageously built into the fluid meter 10 to control the transmitter or transmitters 24 and for the evaluation of the measured signals of the receiver or receivers 26. An optionally implemented temperature sensor (not shown) on the measuring tube 12 opens up further application possibilities, such as e.g. density determination of the fluid F.

The provision of a housing 40 allows an extremely robust fluid meter 10 which is not susceptible to environmental influences to be produced.

In order to make it possible to connect the measuring tube 12 to external (usually round) tubes in a simple manner, the fluid inlet 14 and the fluid outlet 16 in each case have a circular flow cross section, while the fluid channel 18 here has a rectangular flow cross section. A converging nozzle 42 or a diverging nozzle 44 is arranged between the round cross sections of the fluid inlet 14 or of the fluid outlet 16 and the angular cross section of the fluid channel 18, in order to conduct the flow through the measuring tube 12 with as little loss as possible. Converging nozzle 42 and diverging nozzle 44 are preferably opposing, but otherwise designed identical. As diverging nozzles mainly suffer from high flow losses, the edges there at least are preferably rounded and the opening angle of the diverging nozzle 44 is at most 20°, preferably it is less than 10°.

A usual method for homogenizing a flow profile is to accelerate the flow. In the embodiment shown, the flow from the round fluid inlet 14 is accelerated via the converging nozzle 42 into the rectangular fluid channel 18. The flow on the section from the transmitter 24 to the receiver 26 thus has a higher speed than in the fluid inlet 14. As transmitter 24 and receiver 26 are additionally attached to the shorter side of the rectangular cross section of the measuring section 20, a particularly favourable configuration results. The speed is higher and the path covered by the bulk wave V through the fluid F becomes longer. Both together result in a measuring area of the fluid meter 10 which is significantly broadened downwards.

Transmitter 24 and receiver 26 additionally extend over the complete width B of the fluid channel 18 or even beyond it (see FIG. 1c). This makes it possible to acoustically scan the fluid F in the complete channel width B. The fluid meter 10 is thus particularly unsusceptible to a flow unevenly distributed over the flow cross section in the fluid channel 18.

As a whole, even low fluid flows can be measured well with the fluid meter 10 by means of acoustic waves through the use of different wall thicknesses T1 and T2 at the transmitter 24, at the receiver 26 and at the reflection points IP as well as through the choice of the channel cross section, as it makes a long distance traveled by the bulk wave V through the fluid F possible.

FIGS. 2a and 2b show a second embodiment of the fluid meter 10 according to the invention, wherein identical parts bear the same reference numbers in the following and only the differences from the previously described first embodiment are discussed.

In the fluid meter 10 of FIGS. 2a and 2b the measuring tube 12 has a round cross section in the measuring section 20. In addition, in the measuring section 20 in the outer surface of the measuring tube 12 a flat area 46 produced e.g. by milling is formed, on which the transmitter 24 and the receiver 26 are arranged.

In this embodiment example, because of the flat area 46 and the circular cylindrical inner side of the measuring tube 12, a constant wall thickness T1 does not result. Rather, the wall thickness T1 gradually merges into the wall thickness T2 of the rest of the measuring tube 12 in the area of the flat area 46. The continuous grooves 32 are arranged in the edge area of the flat area 46.

Finally, FIGS. 3a and 3b show a third embodiment of the fluid meter 10 according to the invention, wherein here too only the differences from the previously described embodiments are discussed.

In the fluid meter 10 of FIGS. 3a and 3b as well, the measuring tube 12 has a round cross section in the measuring section 20, but no flat area. In this embodiment, the measuring tube 12 can particularly favourably be produced mainly by turning.

The transmitter 24 and the receiver 26 are not designed flat, rather their shape is matched to the round outer surface of the measuring tube 12.

Both the transmitter 24 and the receiver 26 extend at least over part of the circumference U of the measuring tube 12, preferably over the entire circumference U or almost the entire circumference U.

Between the transmitter 24 and the receiver 26 the measuring tube 12 is designed with the second wall thickness T2, wherein a continuous groove 32 in the measuring tube wall 21, in which the measuring tube wall 21 has the first wall thickness T1, is also provided here, with the result that transmitter 24 and receiver 26 are acoustically coupled to each other directly via the groove.

A converging nozzle 42 and a diverging nozzle 44 are not shown, but can also be used advantageously in this embodiment.

Known attenuation elements can be present on the transmitter 24 and/or the measuring tube wall, which ensure a directed transfer of the waves by the transmitter or a directed wavefront, with the result that the reflection points and reflection areas are very precisely defined.

The fluid meter 10 is suitable in particular for liquid, but also for highly viscous, doughy, gelatinous or paste-like media of homogeneous or inhomogeneous type, including biological samples. Use for gaseous media would also be conceivable.

The invention claimed is:

1. A fluid meter for determining at least one characteristic property of a fluid (F), comprising a measuring tube which has a fluid channel allowing the fluid (F) to flow through and which has a measuring section in which at least one area of a measuring tube wall is formed as a waveguide for surface acoustic waves, which forms an interface with the fluid (F), and
at least one transmitter in an area, for exciting acoustic waves in the waveguide as well as at least one receiver in an area, for receiving acoustic waves from the waveguide, the at least one transmitter and at least one receiver being arranged in direct contact with an outer surface of the waveguide,
wherein acoustic waves excited by the transmitter can propagate through the fluid (F) at least in sections as a bulk wave (V) and the bulk wave (V) has at least one reflection point (IP) on the measuring tube wall,
characterized in that the measuring tube wall has a first wall thickness (T1) in the area of the transmitter and in the area of the receiver and has a second wall thickness which differs from the first wall thickness (T1) in the area of all reflection points (IP) of the bulk wave (V).

2. A fluid meter for determining at least one characteristic property of a fluid (F), comprising a measuring tube which has a fluid channel allowing the fluid (F) to flow through and which has a measuring section in which at least one area of a measuring tube wall is formed as a waveguide for surface acoustic waves, which forms an interface with the fluid (F), and
at least one transmitter in an area, for exciting acoustic waves in the waveguide as well as at least one receiver in an area, for receiving acoustic waves from the waveguide, the at least one transmitter and at least one receiver being arranged in direct contact with an outer surface of the waveguide,
wherein acoustic waves excited by the transmitter can propagate through the fluid (F) at least in sections as a bulk wave (V) and the bulk wave (V) can reflect at least once on the measuring tube wall in a reflection area between the transmitter and the receiver,
characterized in that the measuring tube wall has a first wall thickness (T1) in the area of the transmitter and in the area of the receiver and has a second wall thickness (T2) which differs from the first wall thickness (T1) in the reflection area on an imaginary line, running in the tube wall, parallel to a longitudinal axis of the measuring tube, and running through a coupling-in area of the transmitter.

3. The fluid meter according to claim 2, characterized in that the at least one reflection point, in an area in which the measuring tube wall has the second wall thickness, lies between transmitter and receiver, viewed along the longitudinal axis of the measuring tube.

4. The fluid meter according to claim 2, characterized in that the first wall thickness (T1) of the measuring tube wall is smaller than or identical to the wavelength (A) of the surface acoustic wave.

5. The fluid meter according to claim 2, characterized in that the second wall thickness (T2) is 20% to 95% larger or smaller than the first wall thickness (T1).

6. The fluid meter according to claim 2, characterized in that the second wall thickness (T2) is larger than the first wall thickness (T1).

7. The fluid meter according to claim 2, characterized in that between the transmitter and the receiver an intermediate area is provided which is elongate in the axial direction (A)

of the measuring tube and which connects the areas of the transmitter and receiver with the first wall thickness (T1) in the axial direction (A), wherein the intermediate area, in each radial section viewed individually, has a constant wall thickness in the axial direction (A).

8. The fluid meter according claim 2, characterized in that the bulk wave (V) has several reflection points (IP) on the measuring tube wall, wherein the measuring tube wall has the second wall thickness (T2) in the area of each reflection point (IP).

9. The fluid meter according to claim 2, characterized in that the bulk wave (V) has at least 1 to 6 reflection points (IP) on the measuring tube wall in areas of the measuring tube wall which have the second wall thickness (T2).

10. The fluid meter according to claim 2, characterized in that in the area of the transmitter and in the area of the receiver in each case an area of the wall with the first wall thickness (T1) is provided which, starting from a side of the transmitter facing the receiver as well as starting from a side of the receiver facing the transmitter, in each case extends axially over a length (L) of from 1 to 20 wavelengths (A).

11. The fluid meter according to claim 2, characterized in that the areas with different wall thicknesses (T1, T2) merge into each other continuously and step-free at least in the propagation direction of the surface waves.

12. The fluid meter according to claim 2, characterized in that in an intermediate area between the area of the transmitter and that of the receiver a continuous groove in the measuring tube wall, in which the measuring tube wall preferably has the first wall thickness (T1), extends in the area with the second wall thickness (T2), with the result that transmitter and receiver are acoustically coupled to each other directly via the groove, in particular wherein the wall thickness in the intermediate area outside the groove is constant.

13. The fluid meter according to claim 12, characterized in that surface waves outside the fluid (F) propagate from the transmitter to the receiver directly via the continuous groove.

14. The fluid meter according to claim 2, characterized in that several transmitters and/or receivers are provided on the measuring tube, wherein one transmitter and one receiver are arranged on a common wall area with the first wall thickness (T1).

15. The fluid meter according to claim 2, characterized in that the transmitter and the receiver extend over at least 90% of the width (B) of the fluid channel.

16. The fluid meter according to claim 2, characterized in that the measuring tube has an angular cross section in the measuring section.

17. The fluid meter according to claim 16, characterized in that the transmitter and the receiver are arranged on a shorter side of a rectangular cross section of the measuring section.

18. The fluid meter according to claim 2, characterized in that the measuring tube has a round cross section in the measuring section and a flat area, on which the transmitter and the receiver (26) are arranged, is formed in the outer surface of the measuring tube in the measuring section.

19. The fluid meter according to claim 2, characterized in that the measuring tube has a round cross section in the measuring section and the shape of the transmitter and that of the receiver are matched to the round outer surface of the measuring tube.

20. The fluid meter according to claim 19, characterized in that the transmitter and the receiver extend at least over part of the circumference (U) of the measuring tube.

* * * * *